Patented Dec. 12, 1922.

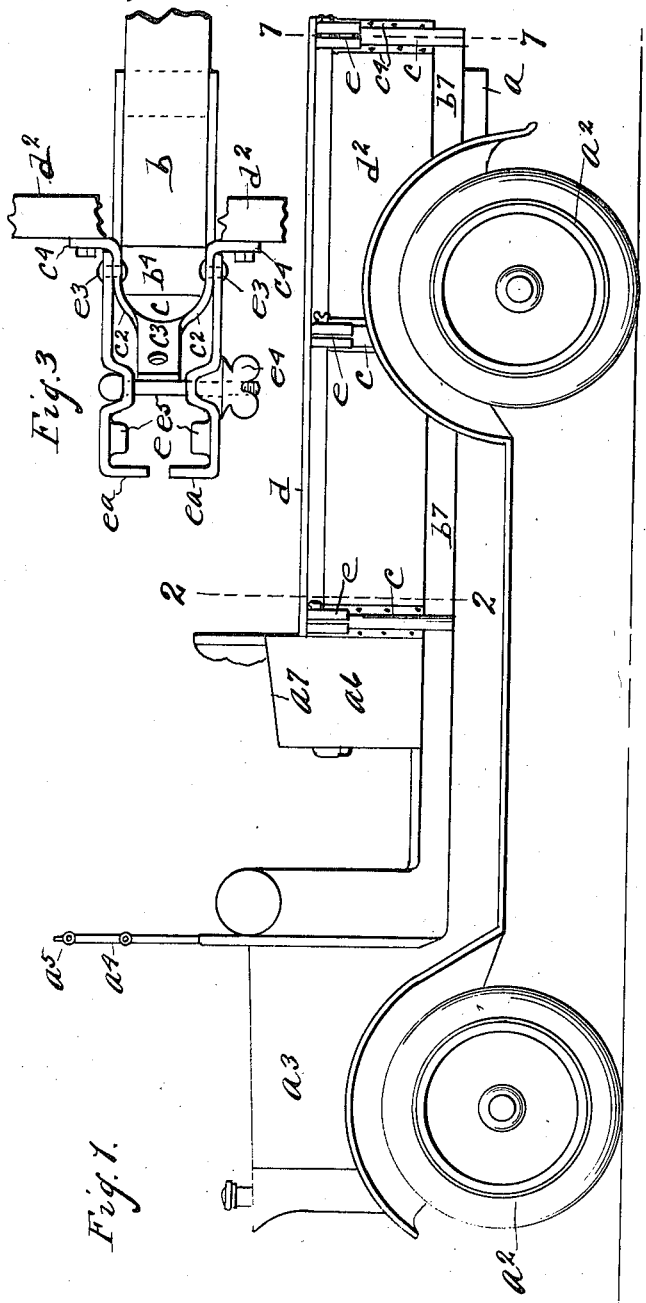

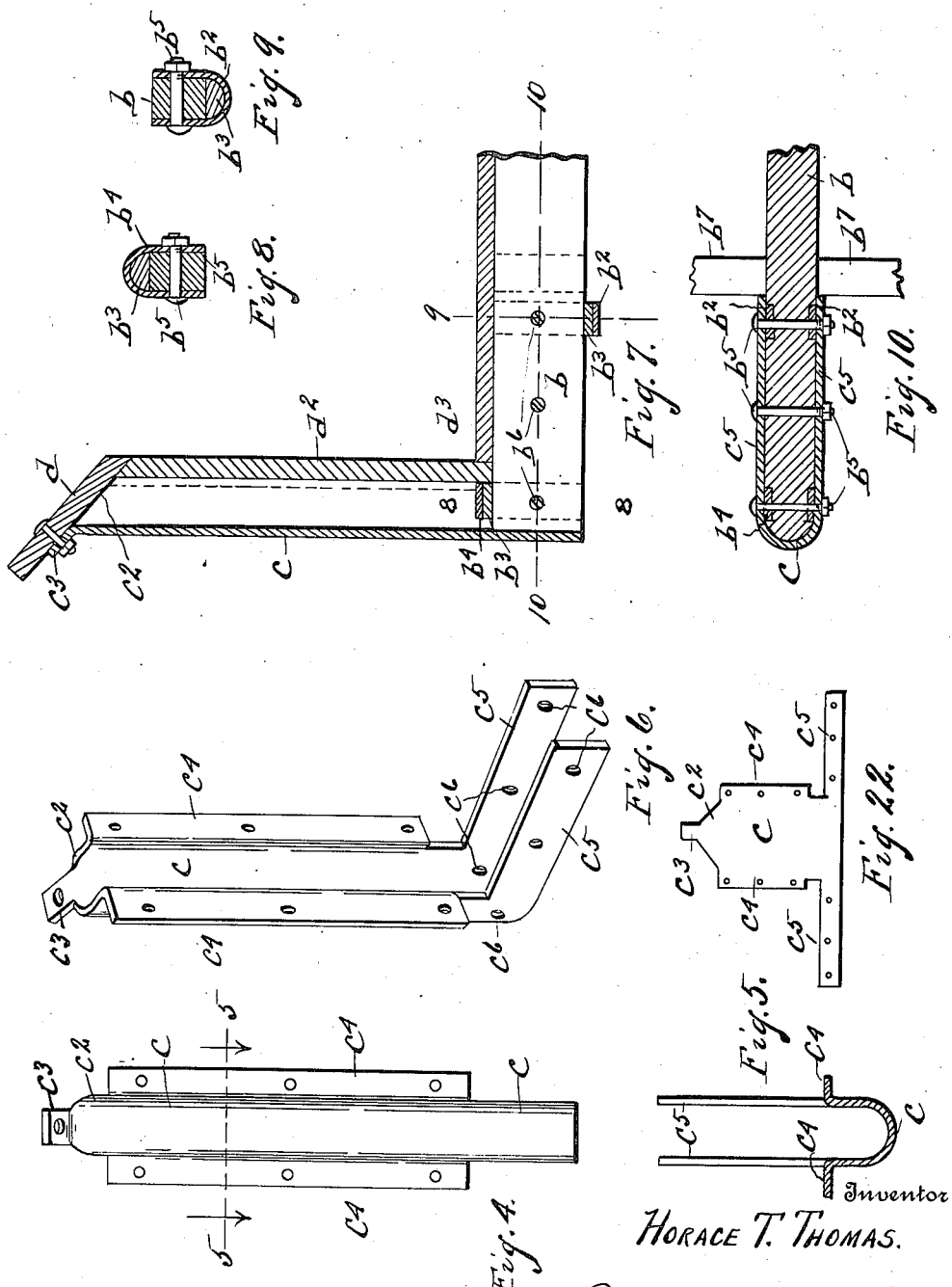

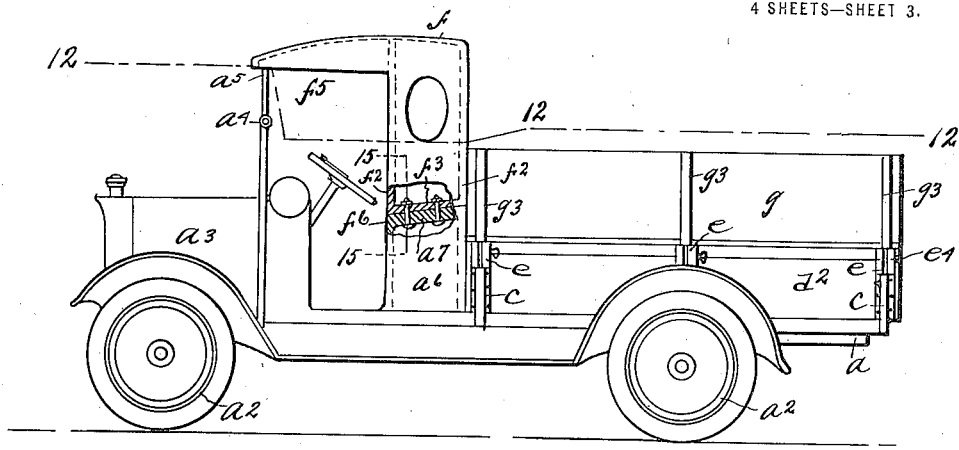
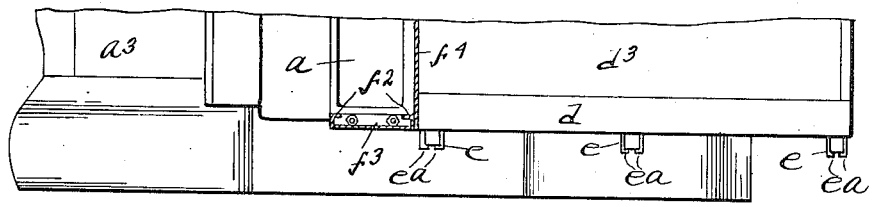
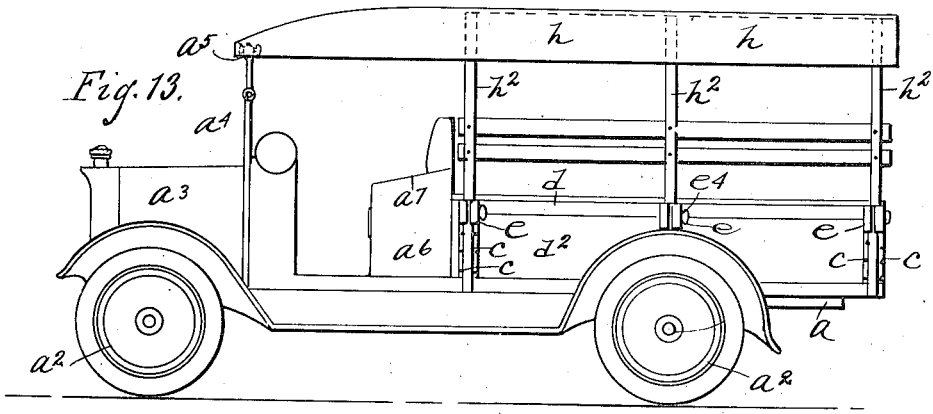
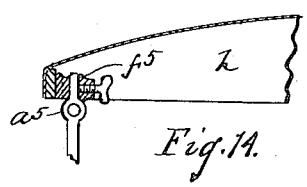
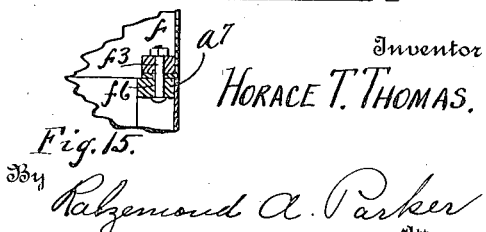

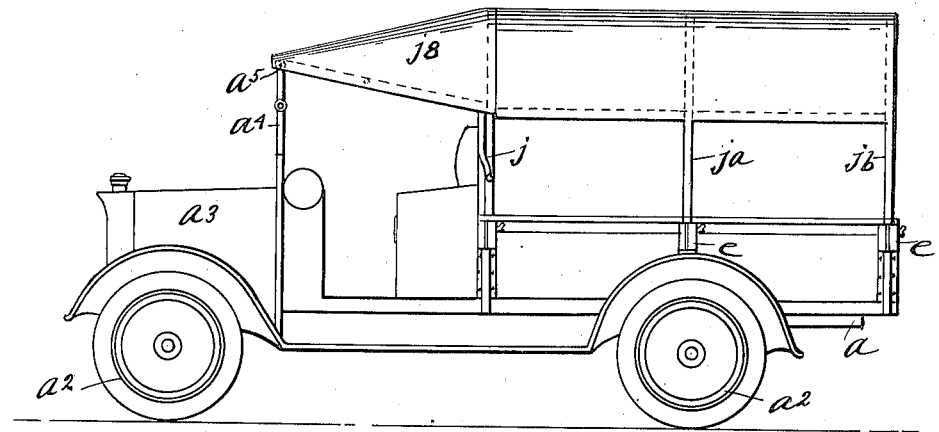
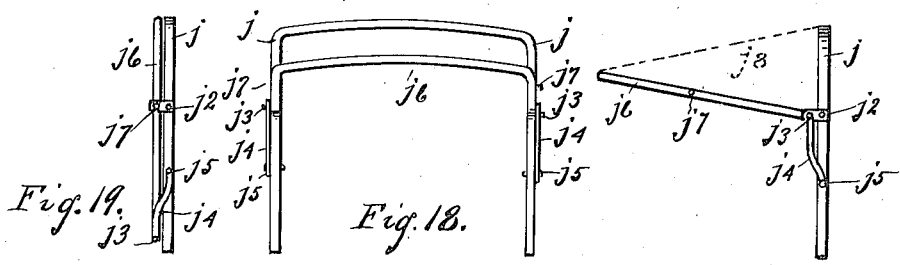
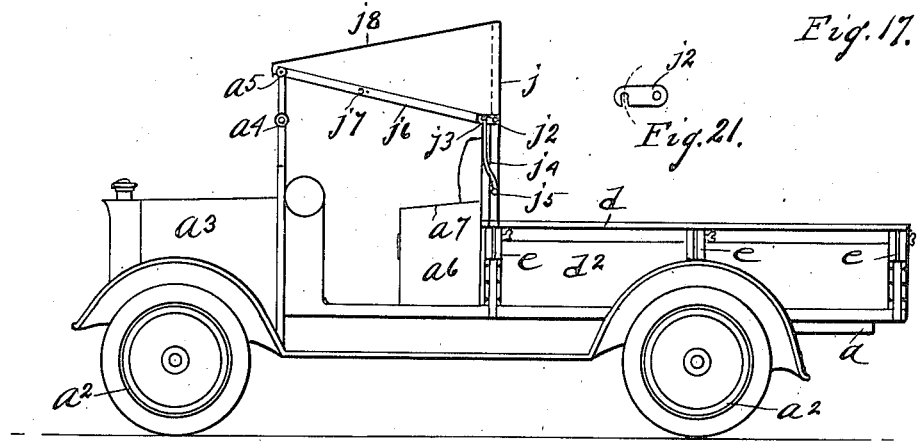

1,438,195

UNITED STATES PATENT OFFICE.

HORACE T. THOMAS, OF LANSING, MICHIGAN.

AUTOMOBILE.

Application filed January 27, 1919. Serial No. 273,298.

*To all whom it may concern:*

Be it known that I, HORACE T. THOMAS, a citizen of the United States, residing at Lansing, county of Ingham, State of Michigan, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

My invention relates to automobiles and an object of my improvements is to provide a commercial vehicle having a convertible construction that shall adapt it to the various uses for which such a vehicle is adapted and to provide for strength, cheapness and adaptability in the various constituent parts and in the combined assembly.

I secure this object in the device illustrated in the accompanying drawings in which:

Figure 1 is an elevation of a commercial vehicle embodying my invention with a box body thereon.

Figure 2 is a section on the line 2—2 of Fig. 1.

Figure 3 is a detail plan view of one of the attaching and supporting fixtures and adjacent parts, to an enlarged scale.

Figure 4 is an elevation of one of the attaching posts looking at the side thereof which is toward the outside when in position on the vehicle.

Figure 5 is a section on the line 5—5 of Fig. 4.

Figure 6 is a perspective view of the attaching posts showing the inside thereof.

Figure 7 is a section of the attaching post and adjacent parts.

Figure 8 is a section on the line 8—8 Fig. 7.

Figure 9 is a section on the line 9—9 Fig. 7.

Figure 10 is a section on the line 10—10 Fig. 7.

Figure 11 is an elevation of an automobile embodying my invention, a frame top for the driver being secured in place and an extension frame being shown secured in place to increase the capacity of the box.

Figure 12 is a detail plan view of a portion of the apparatus shown in Fig. 11, the top being shown in section on the line 12—12 Fig. 11.

Figure 13 is a side elevation of a vehicle embodying my invention, a frame top for the whole of the carrying portion of the vehicle being shown secured in place and replacing the frame top of Fig. 11.

Figure 14 is a detail sectional view showing the method of attaching tops to the wind shield.

Figure 15 is a detail section on the line indicated by the figures 15—15 Fig. 11.

Figure 16 is a side elevation of the construction of Fig. 1, showing a collapsible top in place.

Figure 17 is a detail elevation illustrating the construction and mode of operation of the top.

Figure 18 is a front elevation of the top construction.

Figure 19 is a view similar to Fig. 17, the extension bow being folded against the stationary box.

Figure 20 is a side elevation of the apparatus of Fig. 1, the folding top being extended over the goods-carrying portion of the vehicle.

Figure 21 is a detail showing the latch for securing the extension bow in its folded position.

Figure 22 (Sheet 2) is a view illustrating the blank from which the securing post is made.

$a$ indicates the side pieces of the chassis of the automobile, $a^2$ the wheels, $a^3$ the hood, $a^4$ the wind-shield, $a^5$ the top attaching device upon the wind-shield, $a^6$ the seat and $a^7$ the upper surface of the arm or side of the seat.

$b$ indicates wooden cross bars or beams. There are three of such cross bars in the device illustrated, one at each end of the goods-carrying portion of the body, and one midway between the two end cross bars. $b^7$ indicates the longitudinal bars of the body, one of which is above each of the side pieces $a$ of the frame. It will be observed that inasmuch as these longitudinal bars rest upon the side bars of the chassis that they do not have to provide the strength for sustaining the body longitudinally but dependence may be placed upon the supporting side bars of the chassis for this purpose.

Referring especially to Figures 7 to 10, inclusive, $b^2$ indicates a U-shaped metal bar or strap, the branches of which extend upon each side of the cross bar $b$ at a short distance from its end and are embedded therein so that their outer surfaces shall be flush with the side surfaces of the cross bar as shown in Fig. 10. $b^3$ is a wooden filling piece between the U-portion of the strap $b^2$ and the cross bar. $b^4$ is a U-shaped metal bar or strap shaped and located similar to $b^2$ but having the curved portion joining the branches upon the opposite side of the cross bar $b$. The U-bar $b^4$ is located quite close to the outer end of the cross bar $b^2$ at some little distance from the bar $b^4$ fo the purpose hereinafter described.

The attaching posts, see Figs. 4 to 7 inclusive and Fig. 22 consists of the upright portion $c$ nearly semi-circular in cross section having its upper part at $c^2$ shelving to support the sheer board $d$ and the upper end of the upright $c$ is provided with a lug $c^3$ pierced to receive a bolt for securing the sheer board in place $c^4$ $c^4$ are flanges substantially in a diametral plane thru the axis of the upright portion $c$ and extending laterally therefrom. These flanges are pierced to receive bolts for securing to the body of the car. At the lower end of the upright $c$ are two parallel extending straps $c^5$ $c^5$; these extend inward from each of the edges of the upright $c$ and are spaced from each other the thickness of the upright which is also the thickness of the cross piece $b$. The strap $c^5$ $c^5$ and the lower end of the side walls of the upright $c$ which form the extension of said straps are provided with bolt holes $c^6$.

The U-irons $b^2$ and $b^4$ are provided with bolt holes adapted to register with bolt holes thru the straps $c^5$. This post is constructed by first stamping out a blank as shown in Fig. 22, then bending the respective parts into the position shown in Fig. 6 to form the post. The post is secured in position by adjusting the straps $c^5$ $c^5$ to the side surfaces of the cross bar at its end then inserting bolts $b^5$ thru the bolt holes in said straps, two of these bolts passing also thru bolt holes in the U-irons $b^2$ or $b^4$, the nuts are then placed upon the bolts and drawn tightly to place. The irons $b^2$ and $b^4$ prevent the splitting of the cross bars or the enlargement of the bolt holes thru the cross piece by the stresses brought upon the bolts.

There are three attaching posts $c$ upon each side of the body, one at the rear end of the side and one at the forward end and one in the middle. When the attaching posts $c$ are secured in position a supporting fixture $e$ is secured to the upper end thereof by bolts $e^3$ (Fig. 3) and extends outward in engaging jaws $e$ $a$ to form a socket. There are lugs $e^5$ extending from the lower edges of the engaging jaws $e$ $a$ to limit the downward motion of any part inserted in the socket. $e^4$ is a bolt by which the engaging jaws $e$ $a$ may be drawn together.

$d$ is a board extending slantingly outward from the upper edges of the side pieces $d^2$ of the box. This is secured to the flange $c^3$ and rests upon the slanting upper portion of the attaching post $c$ (Fig. 3).

As thus constructed the vehicle consists as shown in Fig. 1 of the usual hood $a^3$ enclosing the power plant, the wind-shield $a^4$, the seat $a^6$ having arms $a^7$ slanting from the rear toward the front and located at the usual distance from the dash and windshield and of the body or goods carrying part which extends from the back of the seat to and somewhat beyond the rear ends of the side pieces $a$ of the chassis. The seat and space between the same and the dash is to be used by the operator and operating machinery. The space back of the seat is the carrying portion. Both of the last named spaces require different coverings according to the use to which the vehicle is to be put and I have provided for the ready conversion of the vehicle to adapt it to one use or the other and particularly with reference to the covering parts for these spaces or one of them.

$f$ (Fig. 11) is a permanent frame top, the frame having on each side the vertical frame piece $f^2$ and the part $f^3$ joining the lower ends of these vertical frame pieces and conforming to the shape of the upper edge $a^7$ of the arm of the seat. This frame $f$ is adjusted to position by placing it as indicated in Fig. 11 with the part $f^3$ resting upon the upper edge $a^7$ of the seat arm and is secured thereto by bolts $f^6$ passing thru the frame piece $f^3$ for said arm. The upper and forward part of the top $f$ is secured by a clip $f^5$ to the securing pin $a^5$ upon the wind shield. The sides of the top $f$ will have the usual windows as indicated in Fig. 11. With this construction the driver is enclosed in the usual frame top and has the box body back of him and this may be extended by vertical extension boards $g$ provided with upright posts $g^3$ adapted to fit into the sockets of the attaching posts $e$. The extension sheet boards $g$ are placed in position by inserting the posts $g^3$ in the sockets of the holding pieces $e$ and clamping the jaws of the holding piece by means of the bolts $e^4$.

Where a permanent enclosed frame top is not required and some shelter is desired over the goods carrying portion a top $h$ (Fig. 13) may be adjusted to position extending over the goods-carrying portion and the space occupied by the operator and mechanism. For this purpose the top is provided with bows $h^2$ of the usual construction which extend vertically downward at their ends and are adapted to engage in the sockets of the holding pieces $e$ and be secured therein by clamping the jaws. The forward part of the top $h$ is secured to the wind shield at $a^5$ by a clip like device $f^5$ Fig. 14.

When an enclosed top is not required and a covering for the goods-carrying portion may or may not be desired a removable folding top is provided to be adjusted to position, as shown in Fig. 16. This top consists of a bow $j$ of the usual construction having its ends extending vertically downward in position to be engaged in the socket portion of the holding pieces $e$ at the front of the goods-carrying portion of the vehicle and just at the back of the seat. An extension bow $j^4$ $j^6$ is pivoted to the bow $j$ at $j^5$ and consists of two links or joints indicated by the reference characters $j^4$ and $j^6$. These links or joints are pivoted together at their adjacent ends, the pin extending to form engaging lugs $j^3$. Upon the bow $j$ about half way between its upper portion and the joint $j^5$ is pivoted a latch $j^2$ (Fig. 21) having a notch in its outer end adapted to engage the pins $j^3$. There is also an engaging pin $j^7$ extending laterally from the outer joint or link of the extension bow. As thus constructed the links may be turned to the position indicated in Fig. 17 and the pin $j^3$ engaged by the latch $j^2$. The outer end of the outer link $j^6$ will then be supported by the canvas top $j^8$ in the usual way and will be secured to the pin $a^5$ at its outer portion by the clips as above described. When it is desired to fold the top up out of the way the link $j^4$ is turned downward around its pivot $j^5$ and the link $j^6$ is turned upward to lie flat against the bow $j$, as shown in Fig. 19, and is secured in this position by the latch $j^2$. To provide a covering for the goods portion of the vehicle in combination with the collapsible top just above described, I provide two bows $j^a$ and $j^b$ (Fig. 20) of the usual construction and engage their lower ends in the middle and rear engaging pieces $e$. The canvas is then extended over these bows and over the bow $j$ and secured thereto in the usual way.

What I claim is:

1. In a vehicle of the kind described, side posts made of sheet metal bent in concavo-convex form in cross section and provided with lateral flanges for attaching to the side of the vehicle, straps extending inwardly from the edges of said posts at their lower ends and adapted to be secured to the cross piece of the body, a cross piece for the body, said straps lying against the sides of said cross piece and being bolted thereto, two U-irons engaging said cross piece with their bent portions upon opposite sides of the same.

2. In a vehicle of the kind described, side posts made of sheet metal bent in concavo-convex form in cross section having straps extending inwardly from the edges of said posts at their lower ends and adapted to be secured to the cross piece of the body, a cross piece for the body, said straps lying against the sides of said cross piece and being bolted thereto, two U-irons engaging said cross piece with their bent portions upon opposite sides of the same, said straps being secured by bolts passing thru both of said U-pieces.

In testimony whereof, I sign this specification.

HORACE T. THOMAS.